United States Patent [19]
Odell

[11] Patent Number: 4,827,196
[45] Date of Patent: May 2, 1989

[54] MOTOR CONTROL ARRANGEMENT
[75] Inventor: Daniel M. C. Odell, New Milford, Conn.
[73] Assignee: E. I. Du Pont De Nemours and Company, Wilmington, Del.
[21] Appl. No.: 128,409
[22] Filed: Dec. 3, 1987
[51] Int. Cl.[4] .................................................. H02P 6/02
[52] U.S. Cl. .................................... 318/254; 318/480
[58] Field of Search ................ 318/138, 254, 439, 480

[56] References Cited
U.S. PATENT DOCUMENTS

| | | | |
|---|---|---|---|
| 2,512,325 | 6/1950 | Hansen, Jr. | 171/252 |
| 3,083,314 | 3/1963 | Ratajski | 310/219 |
| 3,159,777 | 1/1964 | Manteuffel | 318/138 |
| 3,165,685 | 1/1965 | Manteuffel et al. | 318/138 |
| 3,262,040 | 7/1966 | Jackson | 318/327 |
| 3,419,782 | 12/1968 | Sheldrake et al. | 321/5 |
| 3,476,997 | 11/1969 | Otzipka et al. | 318/138 |
| 3,631,272 | 12/1971 | Kirii et al. | 310/10 |
| 3,667,019 | 5/1972 | Elliott et al. | 318/254 |
| 3,720,865 | 3/1973 | Bregeault | 318/138 |
| 3,760,392 | 9/1973 | Stich | 340/200 |
| 3,775,648 | 11/1973 | Brown et al. | 318/138 |
| 3,778,691 | 12/1973 | Poppinger et al. | 318/254 |
| 3,783,359 | 1/1974 | Malkiel | 318/254 |
| 3,988,654 | 10/1976 | Takahashi et al. | 318/254 |
| 4,167,691 | 11/1979 | Sorensen et al. | 318/138 |
| 4,169,990 | 10/1979 | Lerdman | 318/138 |
| 4,260,938 | 4/1981 | Joyes | 318/139 X |
| 4,311,933 | 1/1982 | Riggs et al. | 310/156 |
| 4,494,057 | 1/1985 | Hotta | 318/317 |
| 4,551,715 | 5/1985 | Durbin | 340/671 |
| 4,554,492 | 11/1985 | Karpowicz | 318/309 |
| 4,564,795 | 1/1986 | Parkes et al. | 318/314 |
| 4,581,711 | 4/1986 | Hirata et al. | 364/550 |
| 4,605,885 | 8/1986 | Mitsuhashi | 318/317 |
| 4,616,162 | 10/1986 | Radomski | 318/317 |
| 4,629,980 | 12/1986 | Overby | 324/166 |
| 4,656,402 | 4/1987 | Nishikawa | 318/341 |
| 4,661,750 | 4/1987 | Mori | 318/326 |
| 4,680,513 | 7/1987 | Kennedy | 318/480 X |
| 4,700,117 | 10/1987 | Giebeler | 318/327 |
| 4,777,382 | 10/1988 | Reingold | 318/254 X |

OTHER PUBLICATIONS

Tartar, R. E., "Principles of Solid State Power Conversion", H. W. Sams & Co., Inc. (1985), Chapters 8 and 9.

Primary Examiner—Bentsu Ro

[57] ABSTRACT

A motor control arrangement for a brushless dc motor is characterized by referencing the motor commutation and current controls at a potential different from that used by the motor. As a result a dynamic control range on the order of 400:1 may be achieved.

4 Claims, 2 Drawing Sheets

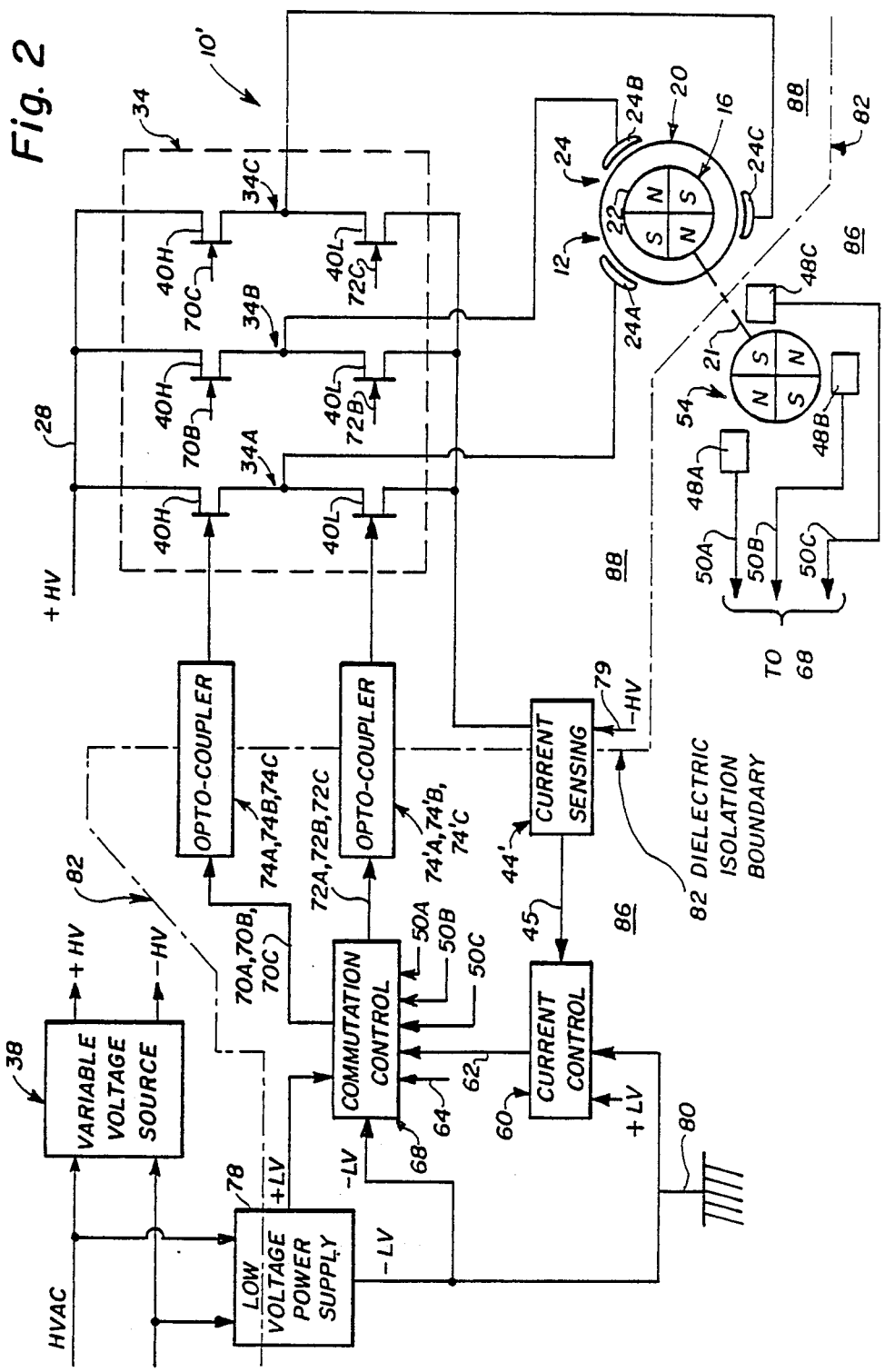

MOTOR CONTROL ARRANGEMENT

BACKGROUND OF THE INVENTION

1. Field of the Invention

This invention relates to a motor control arrangement and in particular to a motor control arrangement for a brushless dc motor used in a centrifuge instrument.

2. Description of the Prior Art

Brushless dc motors are known in the art. Such motors are available from a wide variety of sources, such as, for example, Electric Indicator Company, Incorporated of Norwalk, Conn. Such a motor has a rotating element that carries an array of permanent magnets. A stationary armature formed of multiple phase windings surrounds the rotor. The windings are connected via a switching matrix to positive and negative busses. For a given direction of rotation the position of the permanent magnets on the rotor determines which of the switches are closed with respect to the positive and negative busses. The actual control signals which open and close the appropriate switches are generated by suitable current control and commutation control arrangements in a manner well known to those skilled in the art.

Typically these control elements are connected to the same voltage reference point and share common current paths with the motor. Thus, due to the normal commutation of the phases of the motor there occurs rapid switching of relatively high currents at relatively high voltages. Such conditions are exacerbated when a brushless dc motor is used to drive a centrifuge instrument because of the magnitude of the currents and voltages required to deliver the amount of power necessary to achieve the sustain centrifuge rotor speed. As a result an electrically noisy environment is created in which the control elements must operate.

In view of the foregoing it is believed advantageous to provide a control arrangement for a brushless dc motor used to drive a centrifuge instrument in which the control elements are isolated from the high noise environment.

SUMMARY OF THE INVENTION

The present invention relates to a control system for a brushless dc electric motor of the type in which the torque output of the motor is directly proportional to the current applied thereto. The motor is connectable to positive and negative high voltage busses via a switching matrix. The motor has stationary armature windings with a plurality of phases and a rotating element with permanent magnets mounted thereon. Position sensors for sensing the position of the rotating element with respect to the armature windings and a sensor for sensing the current flow through the phases of the motor are provided. A current control arrangement responsive to the current sensor directly controls the torque output of the motor by controlling the current applied thereto. A low voltage commutation control arrangement responsive to the current control and to the position sensors for producing commutation control signals sequences the application of current to the appropriate phases of the windings by opening and closing the appropriate high voltage switches in accordance with the position of the rotating element. A dielectric interface couples the commutation control signals to the high voltage switches connected to the positive bus. All of the foregoing elements have a common voltage reference and a common current path with the motor such that all are disposed in an electrical environment subject to high levels of electrical noise caused by relatively high steady state motor currents and by power transients induced by switching of relatively high currents at relatively high voltages. By "high level of electrical noise" it is meant that the noise component exceeds the lowest level of signal (current in this case) that is desired to be controlled.

In accordance with the present invention both the commutation control arrangement and the current control arrangement are connected to a different voltage reference and have no common current paths with the motor. The connection is effected in such a way that these elements operate in a lower electrical noise environment. In the preferred case the voltage reference for the commutation control and the current control is chassis ground potential. In addition dielectric interfaces are disposed between all of the high voltage switches and the commutation control such that all commutation control signals are coupled to all of the switches via the interfaces. Thus the commutation control signals are indirectly applied to the switches connected to the high voltage bus and to the low voltage bus. Preferably the dielectric interfaces take the form of opto-electronic devices. As a result of the foregoing the control system is able to control motor current over a dynamic range of at least four hundred to one (400:1).

BRIEF DESCRIPTION OF THE DRAWINGS

The invention will be more fully understood from the following detailed description thereof, taken in connection with the accompanying drawings, which form a part of this application and in which:

FIG. 2 is a schematic diagram of a motor control arrangement in accordance with the present invention.

DETAILED DESCRIPTION OF THE INVENTION

Figure 1:
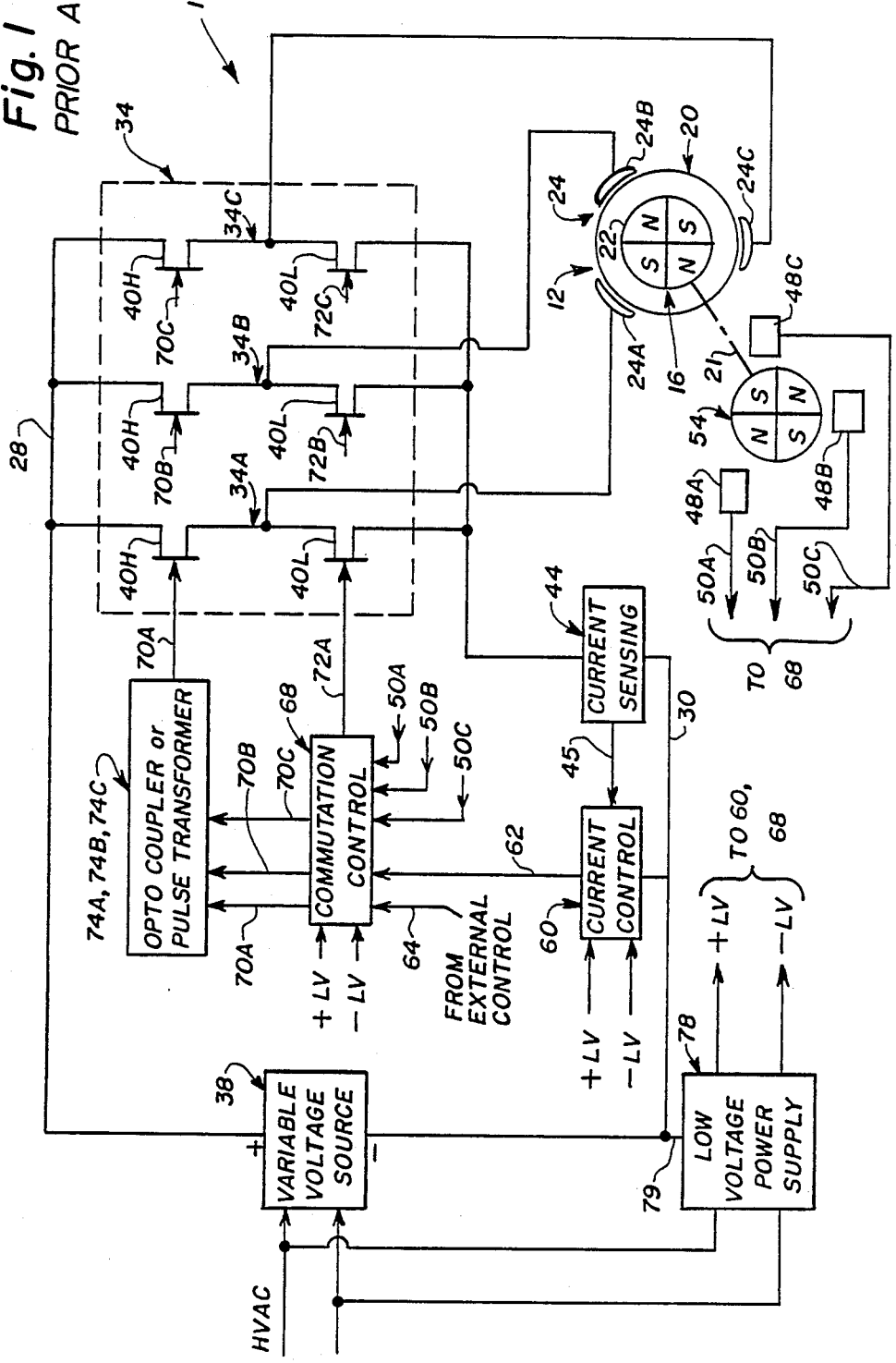
FIG. 1 is a schematic diagram of the motor control arrangement in accordance with the prior art.

Throughout the following detailed description similar reference numerals refer to similar elements in all figures of the drawings.

With reference to FIG. 1 shown is a schematic diagram of a motor control arrangement generally indicated by reference character 10 for a brushless dc motor generally in accord with the prior art. A brushless dc motor, diagrammatically indicated at reference character 12, such as that manufactured and sold by Electric Indicator Company, Incorporated of Norwalk, Conn., includes a rotating element 16 and a stationary armature 20. The rotating element 16 has a shaft 21 which carries a plurality of permanent magnets 22. The magnets 22 define an array of magnetic poles. Any convenient even number of such magnetic poles may be defined, with the typical number of magnetic poles being four. The armature 20 comprises a multiphase winding 24 which may be interconnected in either a wye or delta configuraton or some other desirable arrangement. The phases of the winding 24 are mechanically arranged circumferentially about the rotating element 16. The motor 12 exhibits a torque to applied current characteristic that is substantially linear. That is, the torque output of the motor 12 is directly proportional to the current applied to the armature winding 24.

The phases of the winding 24 are connectable to positive and negative electrical busses 28 and 30, respectively. Typically a voltage range of fifty to three hundred fifty volts dc is defined between the busses 28, 30. The busses 28, 30 are connected through a switching matrix 34 to a source of dc power such as that produced at the output terminals of a variable dc voltage source 38 in a manner known to those skilled in the art. The switching matrix 34 is formed of a plurality of legs each of which includes a switch element 40H and 40L respectively connected to the high voltage bus 28 and to the low voltage bus 30. The number of legs corresponds to the number of phases in the winding 24. In the example illustrated in FIG. 1 the motor winding 24 is shown to include three phases 24a, 24B and 24C (shown diagrammatically) and thus the switching matrix 34 includes legs 34A, 34B and 34C.

A sensor 44, such as a resistive element or a current transformer or a Hall Effect device, is connected in a position to monitor the magnitude of the current flowing through any combination of phases 24A, 24B, 24C of the motor 12. It is common practice to connect the sensor 44 between the negative bus 30 and the switches 40L, as shown in FIG. 1. An array of position sensors 48A, 48B, and 48C is provided to sense the angular position of the rotor 16 with respect to the armature winding 20 and to provide a signal indicative thereof on respective output lines 50A, 50B and 50C. Typically, the position sensors take the form of Hall Effect devices. An auxiliary magnet structure 54 is disposed on the shaft 21 of the rotating element 16 to actuate the sensors 48A, 48B, 48C.

A current control arrangement, or current controller, 60 is responsive to the current sensor 44 through the line 45 for directly controlling the current applied to the motor and thus controlling the torque output produced thereby. In practice the control output from the current controller 60 on the line 62 represents the time duration during which a given one or more of the switches 40H or 40L in a given one or more of the legs 34A, 34B or 34C is to be closed. The time duration may be varied using conventionally known pulse width modulation techniques such as those disclosed in Principles of Solid State Power Conversion, R. E. Tartar, H. W. Sams and Co., Inc. (1985). The pertinent portions of this text, Sections 8 and 9, are hereby incorporated by reference.

The control system further includes a commutation control arrangement 68 responsive to the signals from the position sensors 48A, 48B, 48C on the lines 50A, 50B and 50C, respectively, and to the signal from the current controller 60 on the line 62, and to external control signals typically supplied from a programmable source and applied over a line 64 to generate commutation control signals on lines 70A, 70B and 70C and lines 72A, 72B, and 72C. These commutation control signals sequence the closure of the appropriate switches 40H and 40L in the appropriate legs 34A, 34B and 34C to thus provide current through the associated phases of the winding 24. The lines 70A, 70B and 70C are connected to the switches 40H in each of the legs 34A, 34B and 34C, respectively, while the lines 72A, 72B and 72C are connected to the switches 40L, in each of the legs 34A, 34B and 34C, respectively. A dielectric isolation interface 74A, 74B and 74C illustrated by a single functional block in FIG. 1 is respectively provided in each of the lines 70A, 70B and 70C. Suitable for use as the interface 74 is an opto-electronic coupler such as that manufactured and sold by General Electric as model H11AV2. Alternatively the interface 74 may take the form of a pulse transformer such as that manufactured and sold by Coilcraft Inc. of Cary, Ill. as model number SD250-3. In the typical case, since the switches 40L in each leg 34A, 34B and 34C are operated with reference to the negative electrical bus 30 an interface is not required.

A voltage regulator 78 provides a regulated, relatively low voltage (on the order of plus/minus five to fifteen volts) to power the components in the commutation control arrangement 68 and the current control arrangement 60. The regulator 78 typically has a dielectric isolation boundary between its high voltage ac inputs and its low voltage dc outputs.

All of the elements discussed to this point are, in the prior art implementation, referenced to the same reference potential level, viz., the potential of the negative electrical bus 30, as shown by the reference character 79. Because of that reference connection 79, each of the elements shares a common current carrying path with the motor 12. Normal commutation involves the switching of relatively high currents (on the order of twenty amperes) at the relatively high potential (fifty to three hundred fifty volts) defined between the busses 28, 30. As a result of the inductance of the motor windings 24 and circuit connection paths, and the rapid rate of change of the currents in these elements (on the order of microseconds), large transient voltages occur. These transients manifest themselves as electrical noise present in the entire motor control arrangement 10. This high level of electrical noise effectively limits the ability of the system to operate at low current levels (on the order of five hundred milliamperes or less) since the system design must be insensitive to noise levels that are greater than the lowest desirable current level. Accordingly, when one wishes to operate at the low current level, the system lacks the required sensitivity to effect control at that level.

Reference is now invited to FIG. 2 which is a schematic diagram similar to FIG. 1 showing a motor control arrangement 10' in accordance with the present invention which permits operation at both high and low levels of motor current. The commutation control arrangement 68 and the current control arrangement 60 are connected to a voltage reference 80 different from the voltage reference 79 of the motor 12 and the switching matrix 34. As a result the control elements 60 and 68 do not share a common current path with the motor 12 and are thus not subjected to the high transient-induced electrical noise present in the switching matrix 34 and the motor 12. The control arrangements 60 and 68 are thus, in effect, operated in an environment having lower electrical noise. In the preferred case the reference potential for the control arrangements 60 and 68 is the chassis ground. Other convenient reference potentials may be selected against which to reference the voltages for the control arrangements 60 and 68, so long as a common current path with these elements and the motor and the switching matrix 34 is not defined.

The current sensor 44' used in FIG. 2 is a Hall Effect sensor such as that sold by Microswitch, a division of Honeywell, which preferably combines both average and peak motor current sensing techniques to permit real time monitoring of actual motor current sufficient to accurately control the current at the operating frequency selected and provides a dielectrically isolated indication of the motor current. The sensor 44' is implemented with an added current transformer winding around the magnetic core of the Hall Effect device.

This technique provides DC, low frequency and high frequency isolated sensing capabilities in one device.

The network of the present invention may thus be viewed as having an interface indicated by the dot-dash line 82 on one side 86 of which—the side on which the control arrangements 60, 68 reside—relatively low electrical noise exists as compared to the the opposite side 88 having the relatively higher electrical noise.

Since the control arrangements 60 and 68 do not share a common reference potential with the motor 12 and the switching matrix 34, the interfaces 74', similar to the interfaces 74 discussed above, are necessary to connect the commutation control signal outputs from the commutation control arrangement 68 on the lines 72A, 72B and 72C to the associated switches 40L in the legs 34A, 34B and 34C of the matrix 34. Because of the lower electrical noise level on the side 86, the current controller 60 can successfully monitor and control low motor current levels which were previously masked by the high level of electrical noise. The dynamic range of current controller 60 is thereby enhanced due to an increased signal to noise ratio. The degree of enhancement can be increased by increasing the frequency of the pulse width modulation used in the current controller 60. Preferably operating frequencies on the order of twenty kilohertz are used. It should be understood however that subject to practical limitations imposed by devices 40H, 40L used in the switching matrix 34, the tighter the control of current sought the higher is the frequency of operation to be used. Enhancements on the order of twenty times those available with a system as described in FIG. 1 may be achieved. For example, the motor control arrangmenet 10' accomplishes stable operation throughout the range of desired motor current from fifty milliamperes to twenty amperes, a dynamic range on the order of four hundred to one (400:1).

Consistent with the foregoing the dielectric isolation interfaces 74 and 74' must operate with a propagation delay short enough to permit a stable control loop. To increase the stability of control, especially at low motor currents (on the order of two amperes or less), the pulse width modulated signal on the line 62 is applied simultaneously to the appropriate switches 40H and 40L through the dielectric isolation interfaces 74 and 74' respectively. The propagation delays of each of the dielectric isolation interfaces 74A, 74B, 74C should be one to ten times greater than the propagation delay of the associated dielectric isolation interfaces 74'A, 74'B, 74'C, respectively. For the interfaces 74'A, 74'B, 74'C, the preferred delay times on the order of four hundred nanoseconds or less should be used.

Those skilled in the art having the benefit of the teachings of the present invention as hereinabove set forth may effect numerous modifications thereto. These modifications are to be construed as lying within the contemplation and scope of the present invention as defined by the appended claims.

What is claimed is:

1. In a control system for a brushless dc electric motor of the type in which the torque output of the motor is directly proportional to the current applied thereto and which is connectable to positive and negative high voltage busses via a switching matrix, the switching matrix having switches therein connected to the position and to the negative bus, the motor having
   armature windings with a plurality of phases mounted on a stationary element and
   permanent magnets mounted on a rotating element,
   position sensors for sensing the position of the rotating element with respect to the armature windings,
   a sensor for sensing the current flow through the phases of the motor,
   a current control arrangement responsive to the current sensor for directly controlling the torque output by the motor by controlling the current applied to the motor,
   a low voltage commutation control arrangement responsive to the current control arrangement and to the positive sensors for producing commutation control signals for sequencing the application of current to the appropriate phases of the windings by opening and closing the appropriate switches in accordance with the position of the rotating element,
   a dielectric interface for coupling the commutation control signals from the commutation control arrangement to the switches connected to the positive bus,
all of the foregoing having a common voltage reference and a common current path with the motor such that all are disposed in an electrical environment subject to a high level of electrical noise caused by relatively high steady state motor currents and by power transients induced by switching of relatively high currents at relatively high voltages, this high level of electrical noise masking control signals having amplitude below that noise level
wherein the improvement comprises:
   the commutation control arrangement and the current control arrangement being connected to a different voltage reference and having no common current paths with the motor and the switching matrix in such a way that these arrangements operate in a lower electrical noise environment, and
   a dielectric interface being disposed between the commutation control arrangement and the switches connected to the negative bus,
   the control system thus being able to operate at high current levels and remain sensitive to operate at low current levels.

2. The control system of claim 1 wherein the dielectric interface is an opto-electronic device.

3. The control system of claim 1 wherein the dielectric interface is a pulse transformer.

4. The control system of claim 1 wherein the current control arrangement includes a pulse width modulation device and wherein the improvement further comprises a pulse width modulation device having a frequency of at least twenty kilohertz, whereby the control system is able to achieve a dynamic control range of the motor current on the order of at least four hundred to one (400:1).

* * * * *